UNITED STATES PATENT OFFICE 2,240,088

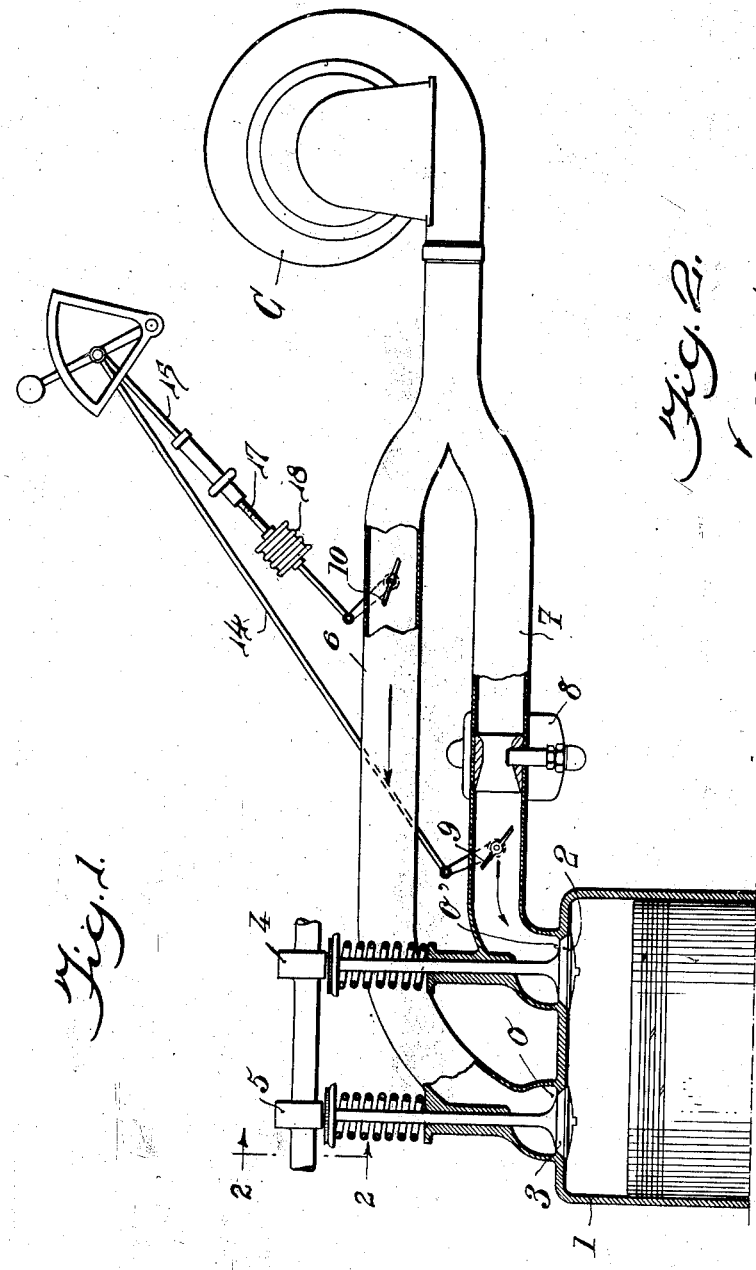

INTERNAL COMBUSTION ENGINE

Louis Birkigt, Versoix, near Geneva, Switzerland

Application June 29, 1938, Serial No. 216,618
In Germany November 30, 1937

12 Claims. (Cl. 123—75)

The present invention relates to internal combustion engines, that is to say engines in which at least a part of the fuel is introduced into the combustion chambers in the form of a carburetted mixture of air and fuel. The invention is more especially, although not exclusively, concerned, with engines of this kind for use on aircrafts, and especially aircrafts which are to fly at high altitude, the problem of cooling being particularly delicate in engines of this kind.

The object of the present invention is to provide an engine of this kind which is better adapted to meet the requirements of practice, and, in particular, in which the parts subjected to high temperatures are better cooled.

According to the essential feature of the present invention, each of the combustion chambers is provided with two inlet orifices and said combustion chambers are fed by means of at least one compressor only a portion of the discharge air of which is mixed with fuel, pure air and air mixed with fuel being then fed separately to said combustion chambers, respectively through each of said inlet orifices.

According to another feature of the present invention, the feed system is provided with means for adjusting the relative rates of feed of pure air and air mixed with fuel, so that said means finally serve to determine the percentage of fuel in the fuel mixture fed to the engine.

Other features of the present invention will result from the following detailed description of some specific embodiments thereof.

A preferred embodiment of the present invention will be hereinafter described, with reference to the accompanying drawing, given merely by way of example, and in which:

Fig. 1 is a diagrammatic view showing a part of an internal combustion engine made according to the present invention and including an arrangement for controlling the valves in the two conduits; and Fig. 2 is a sectional view taken on the line 2—2 of Fig. 1.

In the following description, it will be assumed, merely by way of example, that the engine in connection with which the invention is described is an internal combustion engine intended to be mounted on an aircraft.

Concerning the general structure of the engine in question, with the exception of the distribution and feed systems thereof, it can be made in any suitable manner, for instance this engine may be of the radial type, or, alternately, as it will be hereinafter supposed, it may include several rows of cylinders 1 arranged in V or in any other way.

Concerning now this distribution system, it is made in such manner that each cylinder 1 includes at least two inlet orifices O and O' the opening of which can be adjusted in any suitable manner, for instance by means of two valves 2 and 3, which are respectively controlled by two cams 4 and 5. The respective angular positions of these cams on their shaft will be more specifically referred to in what follows. Advantageously, all the cams corresponding to a row of cylinders are carried by a common shaft.

As for the feed system of the engines, it is constituted, according to the essential feature of the present invention, in such manner that the cylinders 1 of the engine are fed by at least one compressor C, for instance of the centrifugal type, a portion only of the discharge air of which is mixed with fuel, pure air and air mixed with fuel being then fed separately to each cylinder 1, respectively through orifices O and O'.

For this purpose, I have found that it is of advantage to make use of the specific arrangement shown by the drawing.

According to this embodiment, the output or delivery of compressor C is connected with the inlet orifices O and O', respectively through two feed conduits 6 and 7.

On one of these conduits, for instance conduit 7 leading to orifice O', I provide a device for mixing fuel with the air flowing through said last mentioned conduit. This device consists, for instance, of an injecting mechanism, or rather, as shown by the drawing, of a carburetter 8, of any suitable conventional or other type, including a valve such as 9 for controlling its output.

Under these conditions, it will be readily understood that it is possible, by giving suitable relative angular positions to cams 4 and 5, to obtain a scavenging of cylinder 1 by means of pure air. It will suffice, for instance, in order to obtain this result, to arrange that valve 2 is closed and valve 3 is open for the period of rotation of the engine shaft for which it is desired to obtain a scavenging of the engine.

It will be noted that it is further possible to have valves 2 and 3 opened simultaneously for the whole or a part of the inlet period, and, in particular, it is possible to improve the stirring of the carburetted mixture by introducing into cylinder 1, preferably at the end of the period of admission of carburetted air, a jet of pure air under pressure.

Whatever be the specific embodiment that is chosen, I obtain an internal combustion engine the working of which results sufficiently from the preceding explanations for making it unnecessary to give any further explanation.

In all cases, an internal combustion engine made according to the principle of the present invention will have many advantages among which the following can be cited.

Leakage of unburnt carburetted mixture due to outflow thereof through the exhaust pipe is made impossible since the combustion chambers of the engine are scavenged by means of pure air. Furthermore, this scavenging permits of obtaining an improved filling of each engine cylinder since all the gases burnt during the preceding combustion are eliminated. The arrangement according to the present invention therefore avoids wasting fuel and also the risks (which are always dangerous) of ignition of the explosive mixture in the outlet pipe or at the outlet end of said pipe.

The cooling of the hot parts of the engine is improved by the introduction of pure air into the cylinders, so that the cylinder ends and the valves do not become unduly hot.

These two advantages produce an improvement of the efficiency of the engine, so that the working thereof is more economical.

Finally, the exhaust gases, with which pure air is mixed, are cooled by the presence of said air so that the working is less noisy and the risks of fire are reduced.

The system above described is capable of working in a satisfactory manner by itself, but it may be advantageous to complete it by the following features, which can eventually be used separately:

According to one of these features, which is applicable to any internal combustion engine in which only a portion of the feed air is mixed with fuel, but which will be supposed, in the following description, to be applied to the engine just above described, I provide means for regulating and controlling the relative rates of feed of pure air and carburetted air, and, therefore, the final percentage of fuel present in the explosive mixture fed to the engine.

I have explained, in the preceding description, that it is possible to obtain, by a suitable positioning of cams 4 and 5 on their shaft, that cylinder 1 is simultaneously fed with pure air and carburetted air, respectively through orifices O and O'.

The above mentioned means for regulating and controlling the relative rates of feed of pure air and carburetted air to the engine may then consist of an adjustable valve capable of modifying the relative feeds of the gaseous streams flowing respectively through conduits 6 and 7, and consequently the amount of air which is mixed with fuel by means of carburetter 8.

This last mentioned valve means may be arranged at any suitable place, for instance in the carburetted air conduit 7, or again where conduits 6 and 7 branch off from each other. But I consider that it is more advantageous to provide said valve means in the pure air conduit 6. For instance, said valve means may consist of a mere shutter 10.

This shutter 10 may be controlled, according to the present invention, through any of the following means:

(a) Either manual control means adapted to be operated by the pilot; or (b) An automatic control device, such for instance as a device responsive to variations of the altitude and which may be arranged in such manner that the percentage of fuel in the final mixture fed to the engine decreases when the altitude increases.

It should be noted that the control of shutter 10 may eventually be connected with that of valve 9 of the carburetter. But in this case, it is necessary to provide independent control means for said valve 10, so that the pilot is capable of performing either of the two following operations:

(a) Either to adjust the rate of feed of fuel mixture to the engine, by acting simultaneously on both of the valve means 9 and 10, through the intermediate of the interconnected controls of said valve means;

(b) Or to perform merely a qualitative adjustment of said fuel mixture by acting separately on the independent control of valve 10.

Such an arrangement is shown in Fig. 1 in which the movement of the valves 9 and 10 is controlled by two rods 14 and 15 connected to a single handle 16. In such arrangement the valve 10 may be controlled independently by a screw system or turnbuckle mechanism 17 arranged on the rod 15, making it possible to shorten or lengthen the rod at will. Also disposed in the line of the rod 15 is a capsule 18 responsive to changes of altitude. The expansion of the capsule 18 produces the opening of valve 10 and consequently the impoverishment of the final mixture.

Of course, the principle of the present invention would apply to the case of an internal combustion engine in which each cylinder would be provided with a single inlet orifice, pure air and carburetted air being then mixed together before being introduced into said cylinder.

Also, it is clear that the present invention applies to the case in which the inlet orifices would be controlled by means other than lifting valves, for instance slide valves or rotary valves.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In combination, an internal combustion engine having at least one cylinder, at least one air compressor, means for mixing fuel with only one portion of the air delivered by said compressor, means for feeding to said cylinder separately, first a portion of air delivered by said compressor which is mixed with fuel, and then pure air delivered by said compressor, to scavenge the cylinder, the beginning of said introduction of pure air taking place before the next charge of carbureted air is introduced, and means for controlling the relative rates of feed of said portions of the air delivered by the compressor to the cylinder.

2. In combination, an internal combustion engine having at least one cylinder, provided with two distinct inlet orifices, at least one air compressor, means for mixing fuel to only one portion of the air delivered by said compressor, means for feeding said portion of the air delivered by the compressor which is mixed with fuel to one of said orifices, means for feeding the remainder of the air delivered by said compressor to the other orifice to scavenge said cylinder, the beginning of said introduction of pure air taking place before the next charge of carbureted air is introduced.

3. In combination, an internal combustion engine having at least one cylinder, provided with two distinct inlet orifices, at least one air compressor, two separate conduits for connecting the delivery end of said compressor with said orifices, respectively, means for mixing fuel only with the air flowing through one of said conduits, means for feeding to the cylinder separately, first the air mixed with fuel through the first of said conduits, and then pure air delivered by said compressor through the other of said conduits, to scavenge the cylinder, the beginning of said introduction of pure air taking place before the next charge of carbureted air is introduced, and valve means for controlling the relative rate of feed through said two respective conduits.

4. In combination, an internal combustion engine for use in aircraft, said engine having at least one cylinder, at least one air compressor, means for mixing fuel with only one portion of the air delivered by said compressor, means for separately feeding to said cylinder, on the one hand, said portion of the air delivered by said compressor which is mixed with fuel, and, on the other hand, the remainder of the pure air delivered by the compressor, means for controlling the relative rates of feed of said portions of the air delivered by the compressor to the cylinder, and means responsive to variations of the altitude for controlling said last mentioned means to decrease the percentage of fuel in the final mixture as the altitude increases.

5. An internal combustion engine having at least one combustion chamber provided with two distinct positively controlled orifices, a compressor system delivering gaseous fluid towards said combustion chamber at a pressure sufficient to obtain the desired intake pressure, two separate conduits for conducting said compressed gaseous fluid towards said orifices respectively, means for mixing fuel only with the fluid flowing through the first of said conduits towards the first of said orifices, a throttling device in each of said conduits, and means for causing the opening of said first orifice to occur later than the opening of the second orifice.

6. An internal combustion engine having at least one combustion chamber provided with two distinct positively controlled orifices, a single compressor system having a single delivery end for compressing gaseous fluid at a pressure sufficient to obtain the desired intake pressure, two separate conduits for connecting said delivery end with said orifices respectively, means for mixing fuel only with the fluid flowing through the first of said conduits towards the first of said orifices, a throttling device in each of said conduits, and means for causing the opening of said first orifice to occur later than the opening of the second orifice.

7. An internal combustion engine for use in aircraft having at least one combustion chamber provided with two distinct positively controlled orifices, a compressor system delivering gaseous fluid towards said combustion chamber at a pressure sufficient to obtain the desired intake pressure, two separate conduits for conducting said compressed gaseous fluid towards said orifices respectively, means for mixing fuel only with the fluid flowing through the first of said conduits towards the first of said orifices, a throttling device in each of said conduits, and means responsive to the variations of the altitude for controlling the throttling device in the second conduit to decrease the percentage of fuel in the final mixture as the altitude increases.

8. An internal combustion engine for use in aircraft having at least one combustion chamber provided with two distinct positively controlled orifices, a compressor system delivering gaseous fluid towards said combustion chamber at a pressure sufficient to obtain the desired intake pressure, two separate conduits for conducting said compressed gaseous fluid towards said orifices respectively, means for mixing fuel only with the fluid flowing through the first of said conduits towards the first of said orifices, a throttling device in each of said conduits, means for simultaneously actuating both said throttling devices, and means responsive to the variations of the altitude for controlling the throttling device in the second conduit to decrease the percentage of fuel in the final mixture as the altitude increases.

9. An internal combustion engine for use in aircraft having at least one combustion chamber provided with two distinct positively controlled orifices, a compressor system delivering gaseous fluid towards said combustion chamber at a pressure sufficient to obtain the desired intake pressure, two separate conduits for conducting said compressed gaseous fluid towards said orifices respectively, means for mixing fuel only with the fluid flowing through the first of said conduits towards the first of said orifices, a throttling device in each of said conduits, means for simultaneously actuating both said throttling devices, means for actuating the throttling device in the second conduit independently of that in the first conduit, and means responsive to the variations of the altitude for controlling the throttling device in said second conduit to decrease the percentage of fuel in the final mixture as the altitude increases.

10. An internal combustion engine having at least one combustion chamber provided with two distinct positively controlled orifices, a compressor system delivering gaseous fluid towards said combustion chamber at a pressure sufficient to obtain the desired intake pressure, two separate conduits for conducting said compressed gaseous fluid towards said orifices respectively, means for mixing fuel only with the fluid flowing through the first of said conduits towards the first of said orifices, a throttling device in each of said conduits, means for causing the opening of said first orifice to occur later than the opening of the second orifice, and means for actuating the throttling device in the second conduit independently of that in the first conduit.

11. An internal combustion engine having at least one combustion chamber provided with two distinct positively controlled orifices, a single compressor system having a single delivery end for compressing gaseous fluid at a pressure sufficient to obtain the desired intake pressure, two separate conduits for connecting said delivery end with said orifices respectively, means for mixing fuel only with the fluid flowing through the first of said conduits towards the first of said orifices, a throttling device in each of said conduits, means for causing the opening of said first orifice to occur later than the opening of the second orifice, and means for actuating the throttling device in the second conduit independently of that in the first conduit.

12. An internal combustion engine having at least one combustion chamber provided with two distinct positively controlled orifices, a compressor system delivering gaseous fluid towards said combustion chamber at a pressure sufficient to obtain the desired intake pressure, two separate conduits for conducting said compressed gaseous fluid towards said orifices respectively, means for mixing fuel only with the fluid flowing through the first of said conduits towards the first of said orifices, a throttling device in each of said conduits, means for simultaneously actuating both said throttling devices, and means for actuating the throttling device in the second conduit independently of that in the first conduit.

LOUIS BIRKIGT.